United States Patent
Kim et al.

(10) Patent No.: US 10,595,001 B2
(45) Date of Patent: Mar. 17, 2020

(54) APPARATUS FOR REPLAYING CONTENT USING GAZE RECOGNITION AND METHOD THEREOF

(71) Applicant: INDUSTRY-ACADEMIC COOPERATION FOUNDATION, YONSEI UNIVERSITY, Seoul (KR)

(72) Inventors: Shi Ho Kim, Incheon (KR); Sang Ho Lee, Incheon (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 1 day.

(21) Appl. No.: 15/474,269

(22) Filed: Mar. 30, 2017

(65) Prior Publication Data

US 2017/0289518 A1    Oct. 5, 2017

(30) Foreign Application Priority Data

Mar. 30, 2016    (KR) .................. 10-2016-0038257

(51) Int. Cl.
*H04N 13/144* (2018.01)
*H04N 13/344* (2018.01)
(Continued)

(52) U.S. Cl.
CPC ......... *H04N 13/144* (2018.05); *H04N 13/122* (2018.05); *H04N 13/239* (2018.05); *H04N 13/344* (2018.05); *H04N 13/383* (2018.05)

(58) Field of Classification Search
CPC .. H04N 13/144; H04N 13/383; H04N 13/344; H04N 13/239; H04N 13/122
(Continued)

(56) References Cited

U.S. PATENT DOCUMENTS

| 2013/0050070 A1* | 2/2013 | Lewis .................. A61B 3/113 345/156 |
| 2013/0083003 A1* | 4/2013 | Perez .................... G06F 3/005 345/419 |

(Continued)

FOREIGN PATENT DOCUMENTS

| KR | 10-0820639 B1 | 4/2008 |
| KR | 10-2011-0082380 A | 7/2011 |

(Continued)

OTHER PUBLICATIONS

Rados Iaw Mantiuk, Bartosz Bazyluk, and Anna Tomaszewska "Gaze-Dependent Depth-of-Field Effect Rendering in Virtual Environments", International Conference on Serious Games Development and Applications, SGDA 2011 (Year: 2011).*

(Continued)

*Primary Examiner* — Ayman A Abaza
(74) *Attorney, Agent, or Firm* — Sughrue Mion, PLLC

(57) ABSTRACT

An apparatus for replaying content calculates a three-dimensional coordinate using gaze information obtained through gaze-tracking, extracts a focal length corresponding to the calculated three dimensional coordinate and adjusts at least one of a perspective and a focus in a content for stereoscopic three-dimensional displays by adjusting an inter-pupillary distance (IPD) of a rendering stereo camera based on the extracted focal length. The apparatus adjusts the at least one of the perspective and the focus by adjusting a direction of the rendering stereo camera to a direction corresponding to a position of a target object so that the position of the target object is located within a circle of interest (CoI) and adjusts the at least one of the perspective and the focus by blurring a focus for another target object outside the focal length associated with the circle of interest (CoI) according to a convergence angle of both eyes.

10 Claims, 8 Drawing Sheets

(51) Int. Cl.
*H04N 13/383* (2018.01)
*H04N 13/239* (2018.01)
*H04N 13/122* (2018.01)

(58) Field of Classification Search
USPC .......................................................... 348/43
See application file for complete search history.

(56) References Cited

U.S. PATENT DOCUMENTS

2015/0205126 A1* 7/2015 Schowengerdt ..... H04N 13/383
345/633
2015/0237336 A1* 8/2015 Sylvan ................. H04N 13/344
13/344

FOREIGN PATENT DOCUMENTS

KR   10-1200096 B1   11/2012
WO   2015/126735 A1   8/2015

OTHER PUBLICATIONS

Korean Office Action for corresponding Korean Patent Application No. 10-2016-0038257, dated Mar. 15, 2017.

* cited by examiner

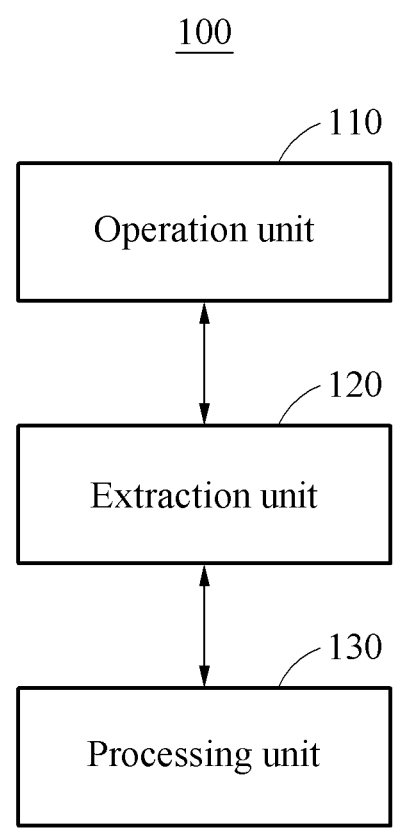
[FIG. 1]

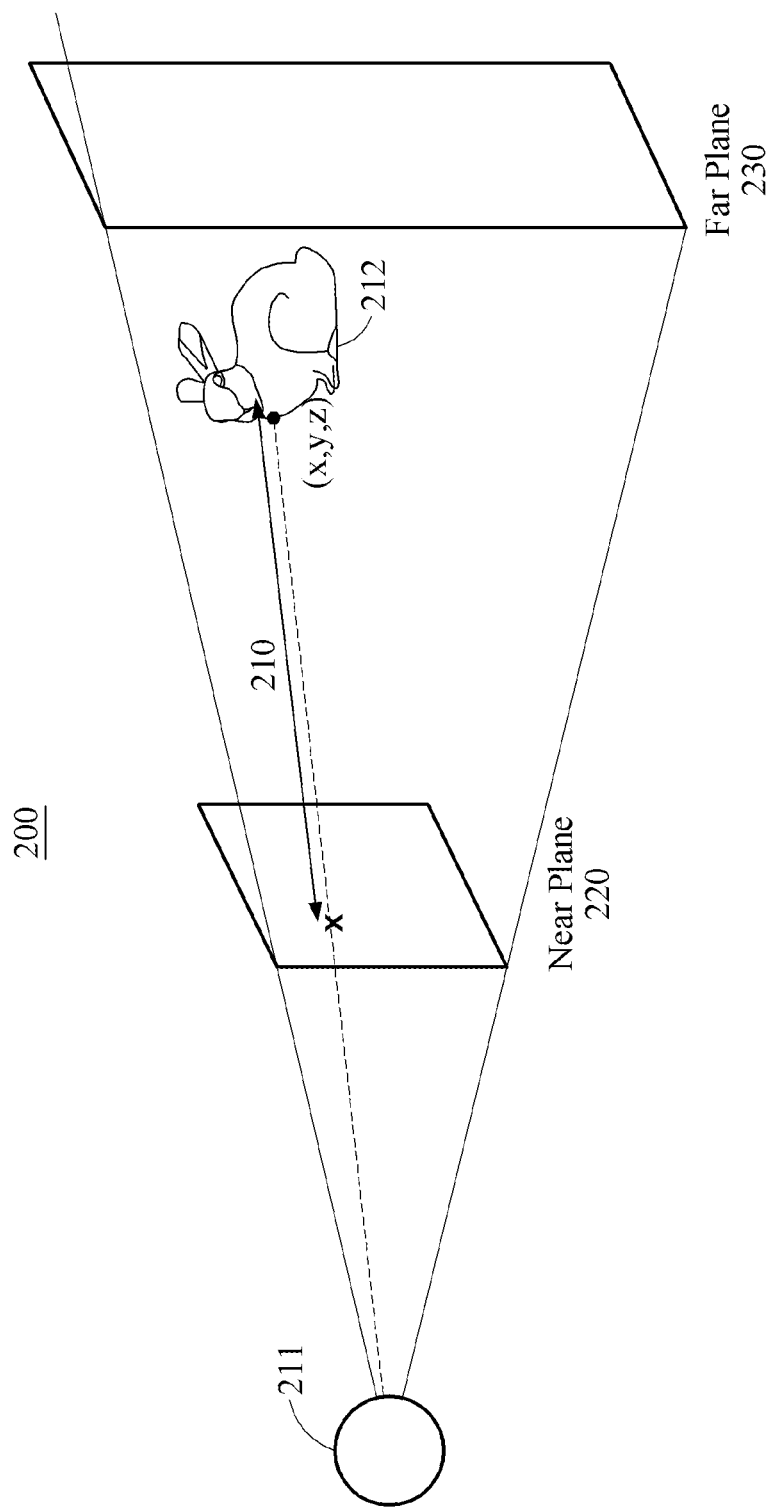

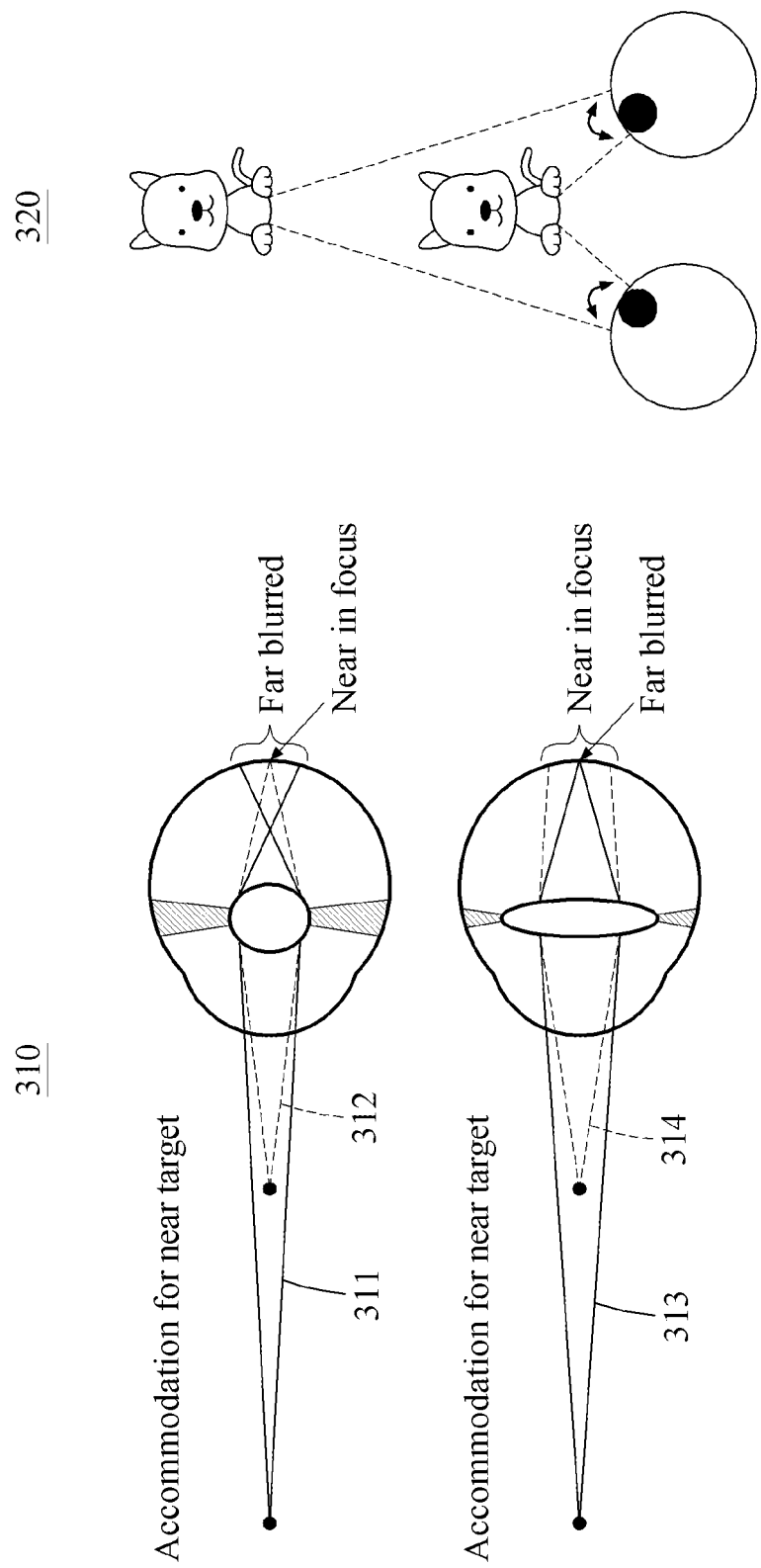
[FIG. 3]

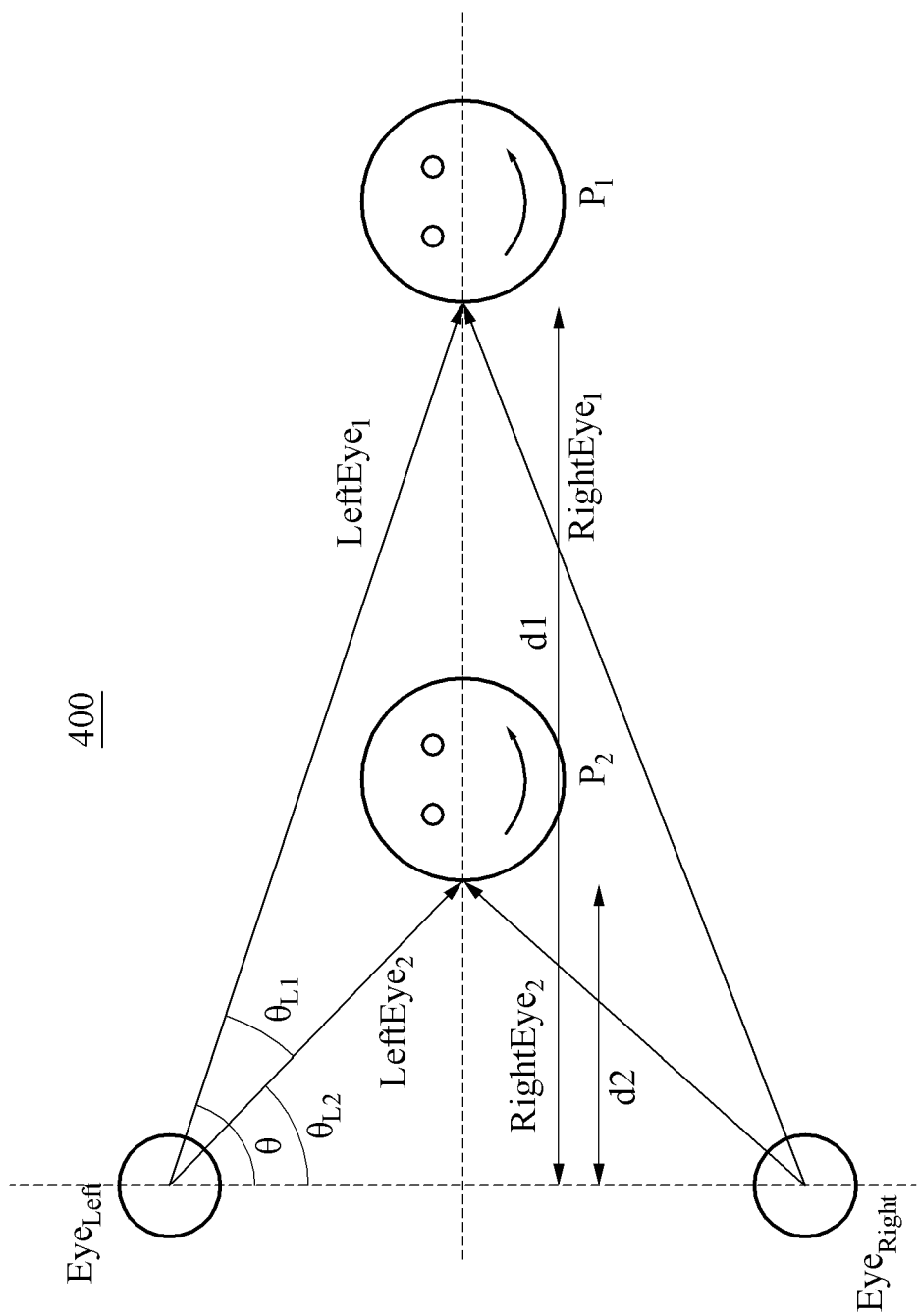
[FIG. 4]

[FIG. 5]
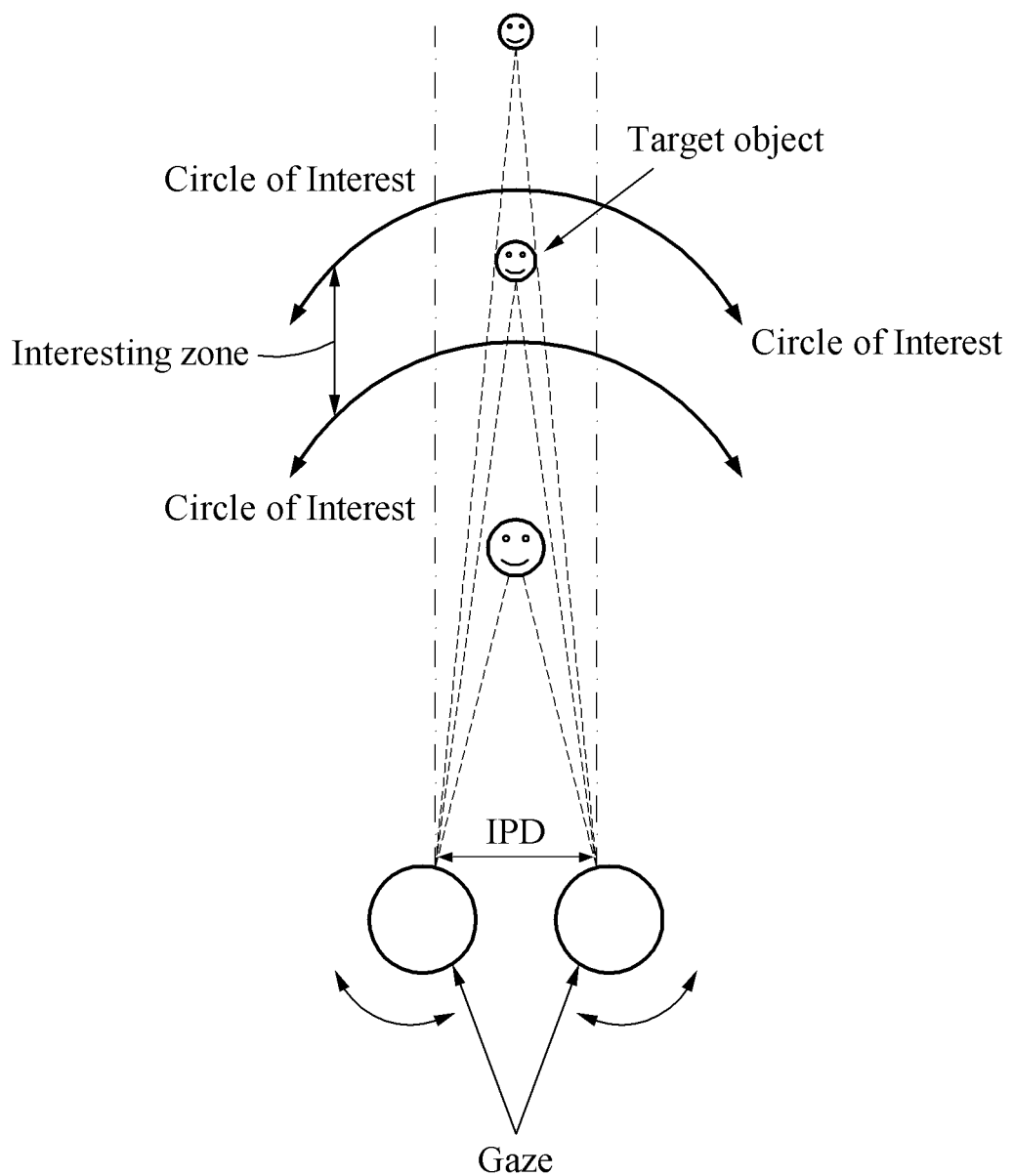

[FIG. 6]
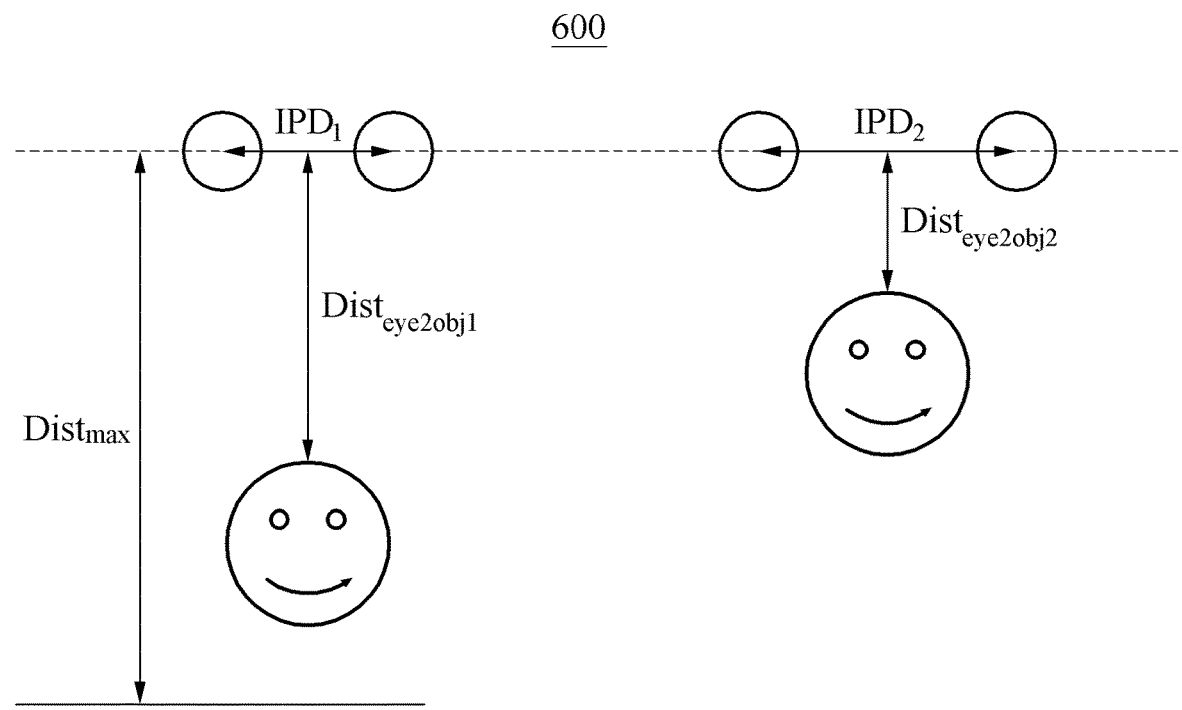

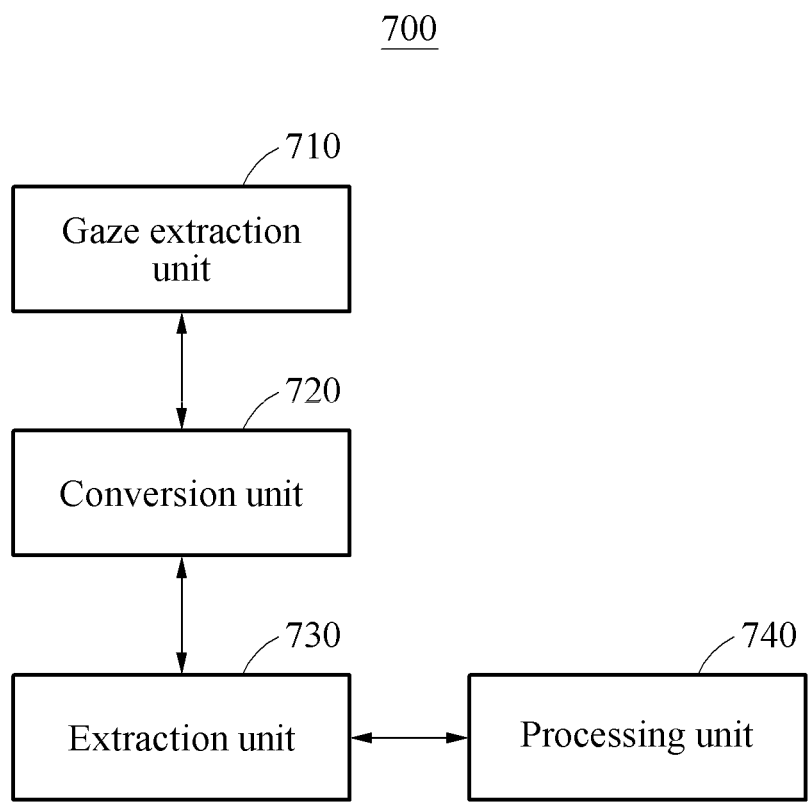
[FIG. 7]

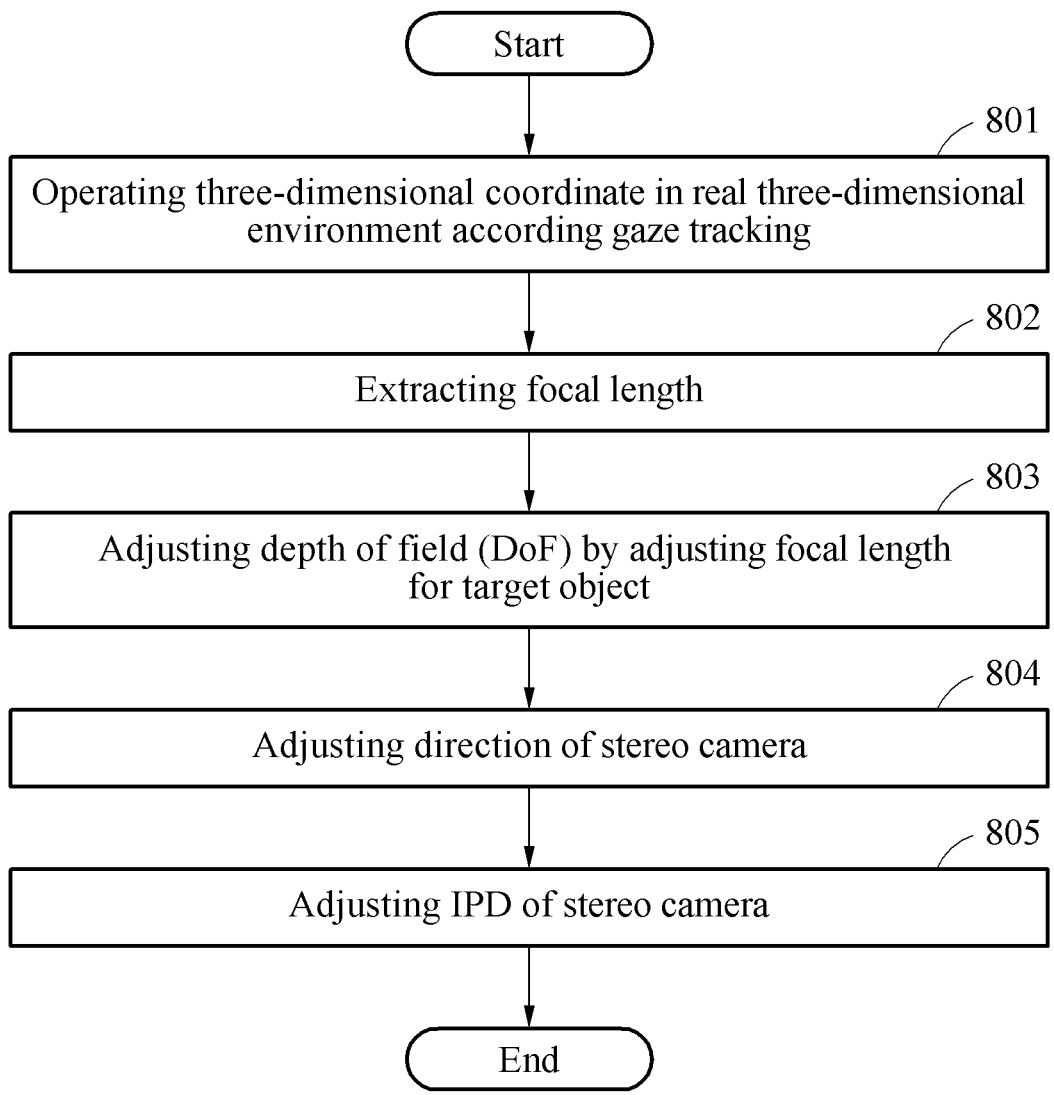

APPARATUS FOR REPLAYING CONTENT USING GAZE RECOGNITION AND METHOD THEREOF

CROSS-REFERENCE TO RELATED APPLICATION

This application claims the priority benefit of Korean Patent Application No. 10-2016-0038257, filed on Mar. 30, 2016 in the Korean Intellectual Property Office, the disclosure of which is incorporated herein by reference.

BACKGROUND OF THE DISCLOSURE

Field of the Disclosure

The present disclosure relates to

The present invention relates to a technology applicable to stereoscopic three-dimensional image content replaying, and more particularly, to a technology for alleviating user's discomfort, such as dizziness, or eye fatigue when using a stereoscopic three-dimensional display.

Description of the Related Art

Virtual reality refers to a human-computer interface that creates a specific environment or situation with a computer and thus makes a person using the same to feel as though he was interacting with a real environment. Virtual reality allows a person to feel as though he was in an environment, without directly experiencing an environment that is hard to experience in everyday life, and to manipulate the environment. Virtual reality technology may be applied to various fields such as games, 3D content, education, teleconferencing, training, advanced programming, remote manipulation, remote satellite surface exploration, data analysis, and scientific visualization.

Virtual reality may be realized by means of apparatuses such as a head-mounted display.

A head-mount display refers to "a display apparatus worn on the head" that makes an object displayed by a small display apparatus in front of the eyes clear and larger through a lens structure.

Conventional head-mounted displays have a fixed focal length. Meanwhile, gaze-tracking technology has been used to determine at which part or object of content replayed by an HMD a user looks.

Since conventional head-mounted displays adopt a fixed screen, it is not possible to consider change in the focal point (accomodation) of the eye lens according to change in focal length between the eyes of a wearer (user) and an object, and a convergence angle of both eyes. That is, in the case of conventional head-mounted displays, a focal length is not reflected to the matching of a focus (accomodation) with convergence according to the object that the user views.

RELATED DOCUMENTS

Patent Documents

Korean Patent No. 10-0820639
Korean Patent No. 10-1200096

SUMMARY OF THE DISCLOSURE

Therefore, the present invention has been made in view of the above problems, and it is one object of the present invention to provide an apparatus for replaying content using gaze recognition and method thereof.

In accordance with an aspect of the present invention, the above and other objects can be accomplished by the provision of an apparatus for replaying content, wherein the apparatus is at least temporarily by a computer and includes: an operation unit that calculates a three-dimensional coordinate using gaze information obtained through gaze-tracking; an extraction unit that extracts a focal length corresponding to the calculated three-dimensional coordinate; and a processing unit that collects at least one of a perspective and a focus in a content for stereoscopic three-dimensional displays based on the calculated focal length.

According to an embodiment of the present disclosure, the operation unit may obtain a two-dimensional coordinate on a screen, monitored by a user, as gaze information, by tracking the pupil of the user.

According to an embodiment of the present disclosure, the operation unit may calculate a three-dimensional coordinate corresponding to the two-dimensional coordinate by applying a picking technique to the obtained two-dimensional coordinate.

According to an embodiment of the present disclosure, the extraction unit may extract a focal length by calculating a distance between the calculated two-dimensional coordinate and a virtual camera.

According to an embodiment of the present disclosure, the processing unit may collect at least one of the perspective and the focus by blurring a focus for another target object outside the calculated focal length.

According to an embodiment of the present disclosure, the processing unit may collect at least one of the perspective and the focus by adjusting a direction of a rendering stereo camera to a direction corresponding to a position of the target object.

According to an embodiment of the present disclosure, the processing unit may collect at least one of the perspective and the focus by adjusting an inter-pupillary distance (IPD) of a rendering stereo camera based on the object distance.

According to an embodiment of the present disclosure, the operation unit may calculate a first object distance between the rendering stereo camera and a first target object and a second object distance between the rendering stereo camera and a second target object, and the processing unit may calculate the inter-pupillary distance (IPD) to be adjusted by reflecting a ratio of the first object distance to the second object distance to the inter-pupillary distance (IPD) of the rendering stereo camera.

In accordance with another aspect of the present invention, there is provided an apparatus for replaying content, wherein the apparatus is at least temporarily realized by a computer and includes: a gaze tracking unit that calculates gaze information on a screen coordinate system by performing gaze-tracking; a conversion unit that performs conversion into a vertex of a three-dimensional object defined on a local coordinate system based on the gaze information on the screen coordinate system; an extraction unit that extracts a focal length using a distance between the vertex of the converted three-dimensional object and the screen coordinate system; and a processing unit that adjusts a depth of field (DoF) based on the extracted focal length.

According to an embodiment of the present disclosure, the gaze tracking unit may calculate gaze information on the screen coordinate system by tracking the pupil of a user.

In accordance with yet another aspect of the present invention, there is provided a method of operating an apparatus for replaying content, at least temporarily realized by a computer, the method including: calculating a three-dimensional coordinate using gaze information obtained through gaze-tracking; extracting a focal length corresponding to the calculated three-dimensional coordinate; and collecting at least one of a perspective and a focus in a content for stereoscopic three-dimensional displays based on the calculated focal length.

According to an embodiment of the present disclosure, in the calculating, a two-dimensional coordinate on a screen monitored by a user may be obtained as gaze information by tracking the pupil of the user.

According to an embodiment of the present disclosure, in the calculating, a three-dimensional coordinate corresponding to the two-dimensional coordinate may be calculated by applying a picking technique to the obtained two-dimensional coordinate.

According to an embodiment of the present disclosure, in the extracting, the focal length is extracted by calculating a distance between the calculated two-dimensional coordinate and a virtual camera.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates an apparatus for replaying content according to an embodiment of the present disclosure;

FIG. 2 illustrates an embodiment of a method of calculating a depth of field using an apparatus for replaying content;

FIG. 3 illustrates a change in the focal point (accomodation) of the eye lens and a convergence angle of both eyes which an apparatus for replaying content according to an embodiment of the present disclosure considers;

FIG. 4 illustrates a change in focal length according to movement of an object;

FIG. 5 illustrates a change in an interesting zone according to a change in focal length;

FIG. 6 illustrates an embodiment of a method of adjusting the length of IPD;

FIG. 7 illustrates another apparatus for replaying content according to an embodiment of the present disclosure; and FIG. 8 illustrates a method of operating an apparatus for replaying content according to an embodiment of the present disclosure.

DETAILED DESCRIPTION OF THE DISCLOSURE

The present invention will now be described more fully with reference to the accompanying drawings, in which exemplary embodiments of the invention are shown. This invention may, however, be embodied in many different forms and should not be construed as limited to the exemplary embodiments set forth herein. Like reference numerals in the drawings denote like elements.

The terminology used in the present disclosure serves the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "includes" and/or "including," when used in this specification, specify the presence of stated features, steps, operations, elements, and/or components, but do not preclude the presence or addition of one or more other features, steps, operations, elements, components, and/or groups thereof.

Also, some of the terms used herein may be arbitrarily chosen by the present applicant. In this case, these terms are defined in detail below. Accordingly, the specific terms used herein should be understood based on the unique meanings thereof and the whole context of the present invention.

FIG. 1 illustrates an apparatus 100 for replaying content according to an embodiment of the present disclosure.

The apparatus 100 for replaying content is different from conventional technology in that a variable focal length that is changeable in real time is found using an eye-tracked coordinate and the found variable focal length is applied to content for wearable virtual reality devices.

To accomplish this, the apparatus 100 for replaying content according to an embodiment of the present disclosure may include an operation unit 110, an extraction unit 120, and a processing unit 130.

The apparatus 100 for replaying content may be at least temporarily realized by a computing terminal. Examples of the computing terminal include any types of electronics such as a personal computer, a medical device, a smart phone, a tablet computer, and a wearable device. Each of the operation unit 110, the extraction unit 120, and the processing unit 130 may be a physical and/or logical element included in such electronics. For example, each of the operation unit 110, the extraction unit 120, and the processing unit 130 may be realized by a general-purpose computing resource that is controlled by dedicated hardware or software or an operating system. In addition, the operation unit 110, the extraction unit 120, and the processing unit 130 may be realized together in one chip, and thus, might not be physically distinguished from each other. In addition, such hardware resource realization may be changed due to technological development or design change. Accordingly, although the functions, operations, and structures of the operation unit 110, the extraction unit 120, and the processing unit 130 are generally understood as being distinguished from each other, such distinction may be differently interpreted depending upon embodiments.

In particular, the operation unit 110 may calculate a three-dimensional coordinate using gaze information obtained through gaze-tracking.

In an embodiment, the operation unit 110 may calculate a three-dimensional coordinate by tracking the pupil of a user. In more detail, the operation unit 110 may preferentially obtain a two-dimensional coordinate, which is provided on a screen monitored by the user, from the tracking result of the user's pupil. In this case, the obtained two-dimensional coordinate may be interpreted as gaze information.

The operation unit 110 according to an embodiment of the present disclosure may obtain gaze information by directly tracking the pupil of a user. In addition, the operation unit 110 may receive a result of gaze-tracking performed by an external module and may operate gaze information using the received result.

In the case of general gaze-tracking technology, a position on a monitor at which a user looks is estimated using neural networks. However, the accuracy of a calculation result according to this technology is low in that there are constraints that a distance between a user and a monitor is not fixed and other complex backgrounds, except for a face, are not present in an input image. However, gaze-tracking technology according to the present disclosure may be applied to content for a wearable virtual reality device, e.g., a virtual reality head-mounted display (VR HMD). In addition, since a distance between a user's pupil and a monitor is fixed due to the characteristics of a wearable virtual reality device, the accuracy of a gaze-tracking result is improved.

However, the technology of the present disclosure is not limitedly applied to content for wearable virtual reality devices and may be applied to general three-dimensional content displays having a stereo display form as a basic configuration. For example, the technology of the present disclosure may be applied to content production and display of three-dimensional images using polarized glasses or electronic shutter glasses.

In an embodiment of the present disclosure, a gaze position may be calculated by installing a camera and a light at a wearable virtual reality device to receive an eye image and by tracking the movement of a user's pupil.

The movement of a user's pupil is free without being affected by the distance between a user and a monitor.

In an embodiment, the operation unit 110 obtains an eye image of a user from a gaze-tracking camera and then may find the center of the pupil, through a circular detection algorithm and the local binarization, from the image. Next, the operation unit 110 finds a light reflected on the eye by the infrared light of a monitor, and may calculate a gaze position using the found pupil center and reflected light centers.

In addition, gaze position calculation errors may occur due to movement of a user's face. However, such errors may be corrected by the operation unit 110 that performs modeling considering positions among a face, a monitor, and a light.

The operation unit 110 may obtain a two-dimensional coordinate, which is provided on a screen monitored by a user by tracking the pupil of the user, as gaze information, and may calculate a three-dimensional coordinate corresponding to the two-dimensional coordinate by applying a picking technique to the obtained two-dimensional coordinate. However, the picking technique is only an example and other techniques, other than the picking technique, may be used to realize the characteristic configuration of the present disclosure.

For example, a two-dimensional coordinate according to gaze-tracking corresponds to a picked spot. Here, the operation unit 110 may calculate a three-dimensional coordinate corresponding to the picked spot.

A two-dimensional coordinate obtained through gaze-tracking refers to a position on a screen, and the operation unit 110 may convert the position of the screen into a three-dimensional coordinate that may be interpreted as a world coordinate.

To accomplish this, the operation unit 110 may convert the two-dimensional coordinate into a three-dimensional coordinate by moving, rotating, size-converting, and the like, the two-dimensional coordinate through world transformation of the rendering pipeline.

Next, the extraction unit 120 may extract focal lengths corresponding to the calculated three-dimensional coordinate. The focal length refers to a distance from the center of an objective lens or the center of a reflecting surface of a main mirror to a focal plane, and may be interpreted as a distance from a two-dimensional coordinate on a screen to a virtual three-dimensional coordinate in the present disclosure.

The processing unit 130 may collect at least one of a perspective and a focus in a content for stereoscopic three-dimensional displays based on the calculated focal length.

For example, the processing unit 130 may adjust a depth of field (DoF) based on the extracted focal length. In particular, the processing unit 130 may collect at least one of a perspective and a focus by blurring the focus on another target object locating outside the calculated focal length.

In an embodiment, an interesting zone in which an image is clearly formed on a human eye may be changed by a focal length. Here, the processing unit 130 may adjust the depth of field such that an image is included in a changed interesting zone. For reference, the interleaving zone may be set as an area between two circles of interest.

In addition, the processing unit 130 may collect at least one of a perspective and a focus by adjusting the direction of a rendering stereo camera to a direction corresponding to the position of the target object, and may collect at least one of the perspective and the focus by adjusting the interpupillary distance (IPD) of the rendering stereo camera based on the distance of an object.

FIG. 2 illustrates an embodiment of a method of calculating a depth of field using an apparatus for replaying content.

The apparatus for replaying content may extract a two-dimensional coordinate (x_scr, y_scr) on a screen 220 by tracking the movement of the pupil 211.

Next, an coordinate (x,y,z) of an object 212 corresponding to the two-dimensional coordinate (x_scr, y_scr) may be calculated through ray-casting. The coordinate (x,y,z) of the object 212 may be located between a screen plane 220 and a three-dimensional space plane 230.

Ray-casting, which is performed to determine whether an emitted light is observed or not, may calculate one pixel spot on a view plane, i.e., one spot, in a gaze direction, passing through the two-dimensional coordinate (x_scr, y_scr), as a coordinate (x,y,z).

The three-dimensional coordinate (x,y,z) corresponding to the two-dimensional coordinate (x_scr, y_scr) may be calculated through a ray casting function and may be based on a geometric-optical technique characterized by tracing the path of light.

Next, the apparatus for replaying content may calculate a distance ([x_c; y_c; z_c], [x; y; z]) between a two-dimensional coordinate and a camera as a virtual environment.

The apparatus for replaying content fixes a focal length 210 using the distance ([x_c; y_c; z_c], [x; y; z]) and then calculates the depth of field.

The depth of field may be interpreted as the depth of a subject and may be adjusted corresponding to a focal length changed according to movement of the user's gaze.

The depth of the subject may be adjusted by circles of interest (CoI).

The circles of interest refer to the depths of field spaced by a certain distance in a stereo camera direction with respect to on a fixed object and in an opposite direction thereof. In the case of a target object present inside the circles of interest, the target object is in focus and thus may be clearly displayed.

FIG. 3 illustrates a change in the focal point (accomodation) of the eye lens and a convergence angle of both eyes which the apparatus for replaying content according to an embodiment of the present disclosure considers.

The depth of a subject may be adjusted through the focus (accomodation) of the lens, which is dependent upon the distance between an object, and the cornea. Referring to Reference Numeral 310, when a focus 312 for a near target is only focused, a focus 311 for a far target is blurred without being focused on the pupil. Meanwhile, when a focus 313 for a far target is only focused, a focus 314 for a near target is blurred without being focused on the pupil.

In addition, according to a convergence angle of both eyes, a focus for a specific object is only focused though rotational movement of the eye and may be blurred for other objects.

The present disclosure may alleviate user discomfort, such as dizziness, or eye fatigue during use of a stereoscopic three-dimensional display by matching the focus (accomodation) of the eye lens with the convergence of both eyes.

FIG. 4 illustrates change in a focal length according to movement of an object.

Referring to Embodiment 400 illustrated in FIG. 4, Eye-Left may be interpreted as the pupil center of the left eye and EyeRight may be interpreted as the pupil center of the right eye.

A gaze corresponds to the intersection of EyeLeft and EyeRight and may be traced during a process of moving from a direction toward a first object corresponding to P1 to a direction toward a second object corresponding to P2.

The object 1 corresponding to P1 is located in a direction rotated by θ on the inter-pupillary distance (IPD) axis, and the object 2 corresponding to P2 is located in a direction rotated by $\theta_{L2}$, i.e., by a direction of θ minus $\theta_{L1}$.

For example, θ, $\theta_{L2}$, and $\theta_{L1}$ may be calculated according to the following [Mathematical Equation 1]:

$$\theta = \tan^{-1}(LeftEye1/d1)$$

$$\theta L2 = \tan^{-1}(LeftEye2/d2)$$

$$\theta_{L1} = \theta - \theta_{L2} \quad \text{[Mathematical Equation 1]}$$

Here, d1 represents a distance from the center of the pupil to the first object, and d2 represents a distance from the center of the pupil to the second object. In addition, d1 and d2 may be increased or decreased in proportion to a focal length. That is, the field depth of an object may be adjusted as a focal length is changed as a result of gaze-tracking.

Since an angle change value in $Eye_{Left}$ is $\theta_{L1}$ found according to [Mathematical Equation 1] when P1 is moved to P2, a camera transformation matrix (homogenenous) may be made.

That is, since only the direction of a camera is adjusted, a change value for a position is 0→x=0.

Referring to this, the camera transformation matrix may be calculated according to [Mathematical Equation 2]:

$$R_{cam} = \begin{bmatrix} \theta_{L1_x} & \theta_{L1_y} & x \\ 0 & 0 & 1 \end{bmatrix}, \quad \text{[Mathematical Equation 2]}$$

$$\theta_{L1_x} = \theta_{L1_y} = 1 \times 2 \text{ vector}$$

FIG. 5 illustrates a change in an interesting zone according to a change in focal length.

Referring to Embodiment 500 illustrated in FIG. 5, the gaze moves in a direction toward an object when the object moves. Accordingly, a two-dimensional coordinate on which the gaze is focused may be calculated by tracking the pupil through gaze tracking, and a three-dimensional coordinate may be extracted from the calculated two-dimensional coordinate through ray-casting.

Assuming that a target object moves from a far distance to a near distance referring to Embodiment 500 of FIG. 5, the depth of field formed by the interesting zone should also be adjusted from a far distance direction to a near distance direction.

The apparatus for replaying content may adjust, based on a focal length, circles of interest of a target object so as to adjust the depth of field from a far distance to a near distance. The circles of interest refer to depths of field spaced by a certain distance in a stereo camera direction with respect to a fixed object and an opposite direction thereof. In the case of a target object located inside the circles of interest, the target object is in focus and thus may be clearly displayed. The apparatus for replaying content may adjust circles of interest for the depth of field reflecting a focal length calculated through gaze tracking such that the target object can be clearly displayed.

The apparatus for replaying content may instantly match a vergence angle of the user's eye with a camera angle corresponding thereto and may additionally adjust IPD by utilizing a focal length calculated according to a result of gaze tracking.

To accomplish this, a processing unit defines a circle of interest (CoI) corresponding to the depth of field (DoF), calculates a circle of confusion (CoC) using the defined CoI, and may process blurring by defining a bounded zone and a parameter for blurring according to the calculated CoC.

The CoI refers to the depth of field spaced by a certain distance in a stereo camera direction with respect to a fixed object and in an opposite direction thereof. In the case of a target object present inside the circles of interest, the target object is in focus and thus may be clearly displayed. Meanwhile, when the target object is located near the stereo camera, dizziness due to mismatch may be prevented by moving a direction of the stereo camera toward the fixed object. That is, in the case of the technology of the present disclosure, a fixed focal length, which has been provided in a fixed state, may be adaptively adjusted by utilizing a focal length obtained through gaze tracking.

FIG. 6 illustrates an embodiment of a method of adjusting the length of IPD.

In the present disclosure, the IPD of the stereo camera may be adjusted to prevent dizziness due to mismatch. In an embodiment of the present invention, dizziness due to mismatch may be prevented by greatly adjusting the IPD of the stereo camera in a state in which the target object is close to the stereo camera.

To accomplish this, an operation unit may calculate a first object distance between a rendering stereo camera and a first target object and a second object distance between the rendering stereo camera and a second target object. Here, a processing unit may calculate the inter-pupillary distance (IPD) to be adjusted by reflecting a ratio of the first object distance to the second object distance to IPD of the rendering stereo camera.

In particular, the IPD for the first target object, i.e., IPD1, may be changed into the IPD for the second target object, i.e., IPD2.

IPD may be interpreted as a distance between the centers of the lenses of the stereo camera, and may be adjusted considering a distance to the target object.

In more detail, IPD2 may be calculated according to the following [Mathematical Equation 3]:

$$IPD_2 = IPD_1 \frac{Dist_{eye2obj2}}{Dist_{eye2obj1}}, \quad \text{[Mathematical Equation 3]}$$

$$\text{if } Dist_{eye2obj2} < Dist_{max}$$

Here, Disteye2obj1 may be interpreted as a shortest distance between the center of the stereo camera and the first object, and Disteye2obj2 may be interpreted as a shortest distance between the center of the stereo camera and the second object.

That is, the apparatus for replaying content may calculate the first object distance (Disteye2obj1) between the stereo camera and the first target object and the second object distance (Disteye2obj2) between the stereo camera and the second target object, and may calculate the inter-pupillary distance (IPD) to be adjusted by reflecting a ratio of the first object distance (Disteye2obj1) to the second object distance (Disteye2obj2) to the inter-pupillary distance (IPD) of the stereo camera.

FIG. 7 illustrates another apparatus 700 for replaying content according to an embodiment of the present disclosure.

An apparatus 700 for replaying content according to an embodiment of the present disclosure includes a gaze tracking unit 710, a conversion unit 720, an extraction unit 730, and a processing unit 740.

The apparatus for replaying content 700 may be at least temporarily realized by a computing terminal. Examples of the computing terminal include any types of electronics such as a personal computer, a medical device, a smart phone, a tablet computer, and a wearable device. Each of the gaze tracking unit 710, the conversion unit 720, the extraction unit 730, and the processing unit 740 may be a physical and/or logical element included in such electronics. For example, each of the gaze tracking unit 710, the conversion unit 720, the extraction unit 730, and the processing unit 740 may be realized by a general-purpose computing resource that is controlled by a dedicated hardware or software or an operating system. In addition, the gaze tracking unit 710, the conversion unit 720, the extraction unit 730, and the processing unit 740 may be realized together in one chip, and thus, might not be physically distinguished from each other. In addition, such hardware resource realization may be changed due to technological development or design changes. Accordingly, although the functions, operations, and structures of the gaze tracking unit 710, the conversion unit 720, the extraction unit 730, and the processing unit 740 are generally understood as being distinguished from each other, such distinction may be differently interpreted depending upon embodiments.

In particular, the gaze tracking unit 710 may calculate gaze information on a screen coordinate system by tracking the movement of the pupil of a user. By tracking the movement of the pupil of a user, a two-dimensional coordinate on a screen monitored by a user may be obtained as the gaze information.

The conversion unit 720 may perform conversion into the vertex of a three-dimensional object, which is defined on a local coordinate system, based on the gaze information on a screen coordinate system.

The conversion unit 720 may calculate a three-dimensional coordinate corresponding to the obtained two-dimensional coordinate by applying a picking technique. In particular, the conversion unit 720 may calculate a three-dimensional coordinate corresponding to the two-dimensional coordinate through ray-casting.

The extraction unit 730 may extract a focal length using a distance between the vertex of the converted 3D object and the screen coordinate, and the processing unit 740 may adjust the depth of field (DoF) based on the extracted focal length.

FIG. 8 illustrates a method of operating an apparatus for replaying content according to an embodiment of the present disclosure.

The method of operating the apparatus for replaying content according to an embodiment of the present disclosure is characterized in that a three-dimensional coordinate in a real three-dimensional environment is calculated according gaze tracking (step 801). For example, the method of operating the apparatus for replaying content is characterized in that a two-dimensional coordinate on a screen may be obtained by gaze tracking. In addition, a three-dimensional coordinate may be calculated using the obtained gaze information. To accomplish this, the method of operating the apparatus for replaying content according to an embodiment of the present disclosure is characterized in that a three-dimensional coordinate in a real three-dimensional environment may be operated by applying a picking technique to a position on a screen.

Next, the method of operating the apparatus for replaying content according to an embodiment of the present disclosure is characterized by extracting a focal length corresponding to the calculated three-dimensional coordinate (step 802), and may collect at least one of a perspective and a focus in a content for stereoscopic three-dimensional displays based on the extracted focal length and the calculated focal length.

In particular, the method of operating the apparatus for replaying content according to an embodiment of the present disclosure is characterized in that a depth of field (DoF) may be adjusted by adjusting a focal length for a target object (step 803).

In addition, the method of operating the apparatus for replaying content according to an embodiment of the present disclosure is characterized in that the direction of the stereo camera may be adjusted (step 804) and the IPD of the stereo camera may be adjusted (step 805).

As a result, the present disclosure is characterized in that a variable focal length that is changeable in real time may be obtained through gaze-tracking and the obtained variable focal length may be applied to a content for wearable virtual reality devices. That is, due to the characteristic of a wearable virtual reality device that a distance between a user's pupil and a monitor is fixed, the accuracy of a result of gaze tracking is improved compared to conventional technology. In addition, when a stereoscopic three-dimensional display is used to replay a three-dimensional image content, user's discomfort, such as dizziness, or eye fatigue may be alleviated.

It is not necessary to change a focal length in a non-virtual environment. However, in a wearable virtual reality device in which fully immersive 3D functions as an essential factor, it is essential to change a focal length.

It would not be necessary to change the focal length if it was not a virtual environment, but this is an essential part of a wearable virtual reality device in which fully immersive 3D is essential.

The aforementioned device may be realized by hardware component, a software component, and/or a combination of hardware and software components. For example, the device and components described in the embodiments may be realized using one or more general-purpose computers or special-purpose computers such as, for example, a processor, a controller, an arithmetic logic unit (ALU), a digital signal processor, a microcomputer, a field programmable array (FPA), a programmable logic unit (PLU), a microprocessor, or other devices implementing instructions and responding thereto. The processor may execute one or more software applications that run on an operating system (OS). In addition, the processor may approach data, store, manipulate, and process the data, and generate new data by responding to running of software. Although one processor has been used to aid in understanding, those skilled in the art can understand that the processor may include a plurality of processing elements and/or a plurality of processing element types. For example, the processor may include a plurality of processors or a combination of one processor and controller. Further, another processing configuration, such as a parallel processor, may be applied.

The software may include a computer program, a code, an instruction, or a combination one or more thereamong, and may constitute the processor to be operated as desired or may collectively or collectively command the processor. A software and/or data may be permanently or temporarily embodied by any type of machines, components, physical devices, virtual equipment, computer storage media or devices, or a transmitted signal wave so as to be interpreted by a processor or provide instructions or data to a processor. The software may be distributed over a networked computer system and stored or executed in a distributed manner. The software and data may be stored in one or more computer readable media.

Embodiments of the present invention can include a computer readable medium including program commands for executing operations implemented through various computers. The computer readable medium can store program commands, data files, data structures or combinations thereof. The program commands recorded in the medium may be specially designed and configured for the present invention or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a high-level language code executable by a computer using an interpreter and the like. The hardware devices may be configured to operate as one or more software modules to perform operations in the embodiments, and vice versa.

Although exemplary embodiments of the present invention have been disclosed for illustrative purposes, those skilled in the art will appreciate that various modifications, additions and substitutions are possible, without departing from the scope and spirit of the invention as disclosed in the accompanying claims. For example, proper result may be achieved even if the techniques described above are implemented in an order different from that for the disclosed method, and/or disclosed constituents such as a system, structure, device and circuit are coupled to or combined with each other in a form different from that for the disclosed method or replaced by other constituents or equivalents.

It should be understood, however, that there is no intent to limit the invention to the embodiments disclosed, rather, the invention is to cover all modifications, equivalents, and alternatives falling within the spirit and scope of the invention as defined by the claims.

What is claimed is:

1. An apparatus for replaying content, the apparatus comprising:
a memory configured to store computer-readable instructions; and
one or more processors configured to execute the computer-readable instructions such that the one or more processors are configured to:
calculate a three-dimensional coordinate using gaze information obtained through gaze-tracking;
extract a focal length corresponding to the calculated three dimensional coordinate; and
adjust at least one of a perspective and a focus in a content for stereoscopic three-dimensional displays by adjusting a distance between centers of first and second lenses of a rendering stereo camera based on the extracted focal length,
wherein the one or more processors adjust the at least one of the perspective and the focus by adjusting an angle of the rendering stereo camera to a direction corresponding to a position of a target object based on the extracted focal length,
wherein the one or more processors calculate a first object distance between the rendering stereo camera, and a first target object and a second object distance between the rendering stereo camera and a second target object,
wherein the one or more processors calculate a distance between the centers of the first and second lenses of the rendering stereo camera to be adjusted by reflecting a ratio of the first object distance and the second object distance to the distance between the centers of the first and second lenses of the rendering stereo camera, and
wherein the one or more processors adjust the at least one of the perspective and the focus by adjusting the distance between the centers of the first and second lenses of the rendering stereo camera, based on the calculated distance between the centers of the first and second lenses of the rendering stereo camera.

2. The apparatus according to claim 1, wherein the one or more processor obtain a two dimensional coordinate on a screen monitored by a user, as the gaze information, by tracking a pupil of the user.

3. The apparatus according to claim 2, wherein the one or more processor calculate the three dimensional coordinate corresponding to the two-dimensional coordinate by applying a picking technique to the obtained two-dimensional coordinate.

4. The apparatus according to claim 2, wherein the one or more processor extract the focal length by calculating a distance between the calculated two-dimensional coordinate and a virtual camera.

5. An apparatus for replaying content, the apparatus comprising:
a memory configured to store computer-readable instructions; and
one or more processors configured to execute the computer-readable instructions such that the one or more processors are configured to:
calculate gaze information on a screen coordinate system by performing gaze-tracking;
perform conversion into a vertex of a three-dimensional object defined on a local coordinate system based on the gaze information on the screen coordinate system;
extract a focal length using a distance between the vertex of the converted three-dimensional object and the screen coordinate system; and
adjust at least one of a perspective and a focus in a content for stereoscopic three-dimensional displays by adjusting a distance between centers of first and second lenses of a rendering stereo camera based on the extracted focal length,
wherein the one or more processors adjust the at least one of the perspective and the focus by adjusting an angle of the rendering stereo camera to a direction corresponding to a position of a target object based on the extracted focal length,
wherein the one or more processors calculate a first object distance between the rendering stereo camera and a first target object and a second object distance between the rendering stereo camera and a second target object,
wherein the one or more processors calculate a distance between the centers of the first and second lenses of the rendering stereo camera to be adjusted by reflecting a ratio of the first object distance and the second object distance to the distance between the centers of the first and second lenses of the rendering stereo camera, and
wherein the one or more processors adjust the at least one of the perspective and the focus by adjusting the distance between the centers of the first and second lenses of the rendering stereo camera based on the calculated distance between the centers of the first and second lenses of the rendering stereo camera.

6. The apparatus according to claim 5, wherein the one or more processors calculate the gaze information on the screen coordinate system by tracking a pupil of a user.

7. A method of operating an apparatus for replaying content, wherein the apparatus comprises a memory configured to store computer-readable instructions and one or more processors configured to execute the computer readable instructions, the method comprising:
calculating, by the one or more processors, a three-dimensional coordinate using gaze information obtained through gaze-tracking;
extracting, by the one or more processors, a focal length corresponding to the calculated three-dimensional coordinate; and
adjusting, by the one or more processors, at least one of a perspective and a focus in a content for stereoscopic three dimensional displays by adjusting a distance between centers of first and second lenses of a rendering stereo camera based on the extracted focal length,
wherein, in the adjusting, the at least one of the perspective and the focus is adjusted by adjusting an angle of the rendering stereo camera to a direction corresponding to a position of a target object based on the extracted focal length,
wherein, in the adjusting, a first object distance between the rendering stereo camera and a first target object and a second object distance between the rendering stereo camera and a second target object are calculated,
wherein, in the adjusting, a distance between the centers of the first and second lenses of the rendering stereo camera to be adjusted is calculated by reflecting a ratio of the first object distance and the second object distance to the distance between the centers of the first and second lenses of the rendering stereo camera, and
wherein, in the adjusting, the at least one of the perspective and the focus is adjusted by adjusting the distance between the centers of the first and second lenses of the rendering stereo camera based on the calculated distance between the centers of the first and second lenses of the rendering stereo camera.

8. The method according to claim 7, wherein, in the calculating, a two-dimensional coordinate on a screen monitored by a user is obtained as the gaze information by tracking a pupil of the user.

9. The method according to claim 8, wherein, in the calculating, the three-dimensional coordinate corresponding to the two-dimensional coordinate is calculated by applying a picking technique to the obtained two-dimensional coordinate.

10. The method according to claim 8, wherein, in the extracting, the focal length is extracted by calculating a distance between the calculated two-dimensional coordinate and a virtual camera.

\* \* \* \* \*